(12) United States Patent
Becher et al.

(10) Patent No.: US 7,437,937 B2
(45) Date of Patent: Oct. 21, 2008

(54) RELATIVE PRESSURE MEASURING TRANSMITTER

(75) Inventors: Raimund Becher, Ehrenkirchen (DE); Juergen Tanner, Kandern (DE)

(73) Assignee: Endress + Hauser GmbH + Co. KG, Maulburg (DE)

( * ) Notice: Subject to any disclaimer, the term of this patent is extended or adjusted under 35 U.S.C. 154(b) by 0 days.

(21) Appl. No.: 10/552,625

(22) PCT Filed: Apr. 6, 2004

(86) PCT No.: PCT/EP2004/003680

§ 371 (c)(1),
(2), (4) Date: Jan. 8, 2007

(87) PCT Pub. No.: WO2004/090494

PCT Pub. Date: Oct. 21, 2004

(65) Prior Publication Data

US 2007/0163354 A1   Jul. 19, 2007

(30) Foreign Application Priority Data

Apr. 7, 2003 (DE) .............................. 103 16 033

(51) Int. Cl.
*G01L 7/00* (2006.01)
(52) U.S. Cl. ......................................... 73/706; 73/716
(58) Field of Classification Search .................. 73/716, 73/706
See application file for complete search history.

(56) References Cited

U.S. PATENT DOCUMENTS 5,036,884 A * 8/1991 Miller et al. ................. 137/597
5,725,024 A * 3/1998 Nimberger .................. 137/597

* cited by examiner

*Primary Examiner*—Andre J Allen
(74) *Attorney, Agent, or Firm*—Bacon & Thomas, PLLC

(57) ABSTRACT

A relative pressure measuring transmitter resistant to the intrusion of moisture. includes a housing, an insert arranged in the housing, a gap existing between the housing and the insert, a relative pressure sensor, and, connected to the relative pressure sensor, a reference pressure supply line, which leads into the insert, opens on an outer wall of the insert, and has an interior, which is connected via an opening in insert with the gap The housing has a bore passing through it, via which the gap is placed in communication with an environment of the relative pressure measuring transmitter.

6 Claims, 2 Drawing Sheets

RELATIVE PRESSURE MEASURING TRANSMITTER

FIELD OF THE INVENTION

The invention relates to a relative pressure measuring transmitter having a housing, a relative pressure sensor, and, connected to the relative pressure sensor, a reference pressure supply line, via which the relative pressure sensor is placed, through a bore passing into the housing, in communication with an environment of the relative pressure measuring transmitter.

BACKGROUND OF THE INVENTION

In the technology of pressure measurement, a distinction is made between difference, absolute and relative pressure measuring transmitters. Pressure difference measuring transmitters serve for measuring the difference between two different pressures. In the case of absolute pressure measuring transmitters, a pressure to be measured is registered absolutely, i.e. as a pressure difference relative to a vacuum. With a relative pressure measuring transmitter, a pressure to be measured is sensed in the form of a pressure difference relative to a reference pressure. The reference pressure is, as a rule, an ambient pressure existing at the location where the relative pressure measuring transmitter is located. In the case of most applications, this is the atmospheric pressure at the site of use. If the sensor is, however, installed e.g. in a space under positive or negative pressure, then the reference pressure is the internal pressure existing in the space.

In the case of some conventional relative pressure measuring transmitters, the reference pressure supply runs from the relative pressure sensor into an internal space in the housing and ends there. The housing then has a bore leading to the outside, via which the reference pressure supply is connected to the environment of the relative pressure measuring transmitter.

The bore is routinely connected with a filter, which is supposed to prevent intrusion of moisture.

Depending on temperature of the environment, however, there is always a certain fraction of moisture contained in the medium surrounding the relative pressure measuring transmitter, be it air or a gas. Usual commercial filters are not able to completely filter this moisture out. Through an exchange of the medium, which surrounds the relative pressure measuring transmitter, moisture can, therefore, pass through the filter, into the interior space. The larger the internal space of the housing, the greater is the amount of medium exchanged in such case, and, concomitantly, the greater is the intruding moisture.

If the temperature in the environment is higher than the temperature inside the housing, then the dew point can be subceeded, or fallen beneath, inside the housing, this leading to the formation of condensate, which deposits inside the housing. The condensate accumulates in the housing.

Electronic circuits possibly present in the housing, and the relative pressure sensor, are, as a rule, very sensitive to moisture.

SUMMARY OF THE INVENTION

An object of the invention is to provide a relative pressure measuring transmitter, which is protected against an intrusion of moisture.

To this end, the invention resides in a relative pressure measuring transmitter including a housing,
an insert arranged in the housing,
a gap between the housing and the insert,
a relative pressure sensor, and,
connected to the relative pressure sensor, a reference pressure supply line, which
leads into the insert,
vents at an outer wall of the insert, and
has an interior, which is connected with the gap via an opening in the insert,
wherein a bore passes through the housing, for placing the gap in communication with an environment of the relative pressure measuring transmitter.

In a further development, the insert is made of a moisture-resistant material, especially a plastic.

In a further development, an electrically conductive layer is provided inside the insert, surrounding an internal space of the insert.

In a further development, the gap is bounded by two seals compressed between the housing and the insert.

In a further development, a direct connection in the gap between the bore and the opening includes a circular segment centered about a longitudinal axis of the insert or of the housing.

In a further development, the bore in the housing is located on a side of the insert lying opposite the opening.

In an embodiment, the bore has a length of at least six millimeters, and a pin is inserted into the bore.

In an embodiment, the opening is closed by a moisture-rejecting, gas-permeable filter An advantage of the invention is that the reference pressure supply has a very small volume compared to the internal space of the housing. The volume is formed essentially of an inner volume of the reference pressure supply line and an internal volume of the gap. A small volume offers the advantage that smaller amounts of the medium are exchanged between the inner volume and the environment.

A further advantage is that the reference pressure supply has a large length. It leads from the bore, through the gap and the entire length of the reference pressure supply line, to the relative pressure sensor. Between the medium located near the relative pressure sensor and the medium surrounding the relative pressure measuring transmitter, essentially no exchange takes place, due to the large distance to be traveled for such purpose and the small volume per distance available for such purpose along the path. In contrast, transmission of the reference pressure still occurs essentially unimpaired.

Moisture nevertheless intruding will collect in the area near the bore, especially in the gap, and, under the right conditions, condense there. Since the insert is made of a moisture-resistant material, this experiences no negative consequences. A further advantage is that the gap is sealed by two seals. So, moisture which possibly intrudes into the gap can neither pass into the interior of the insert nor into internal spaces of the housing beyond the gap. Both the relative pressure sensor and any electronic circuit possibly present in the interior of the insert are thus protected from moisture.

Additionally, the seals offer the advantage that the gap can be fabricated in very simple manner and the insert is secured in the housing by the two seals.

BRIEF DESCRIPTION OF THE DRAWINGS

The invention and further advantages will now be explained in greater detail on the basis of the drawing, in which an example of an embodiment is presented; equal elements are provided in the figures with equal reference characters.

FIG. 1 shows a section through a relative pressure measuring transmitter; while

DESCRIPTION OF THE PREFERRED EMBODIMENTS

Figure 1:
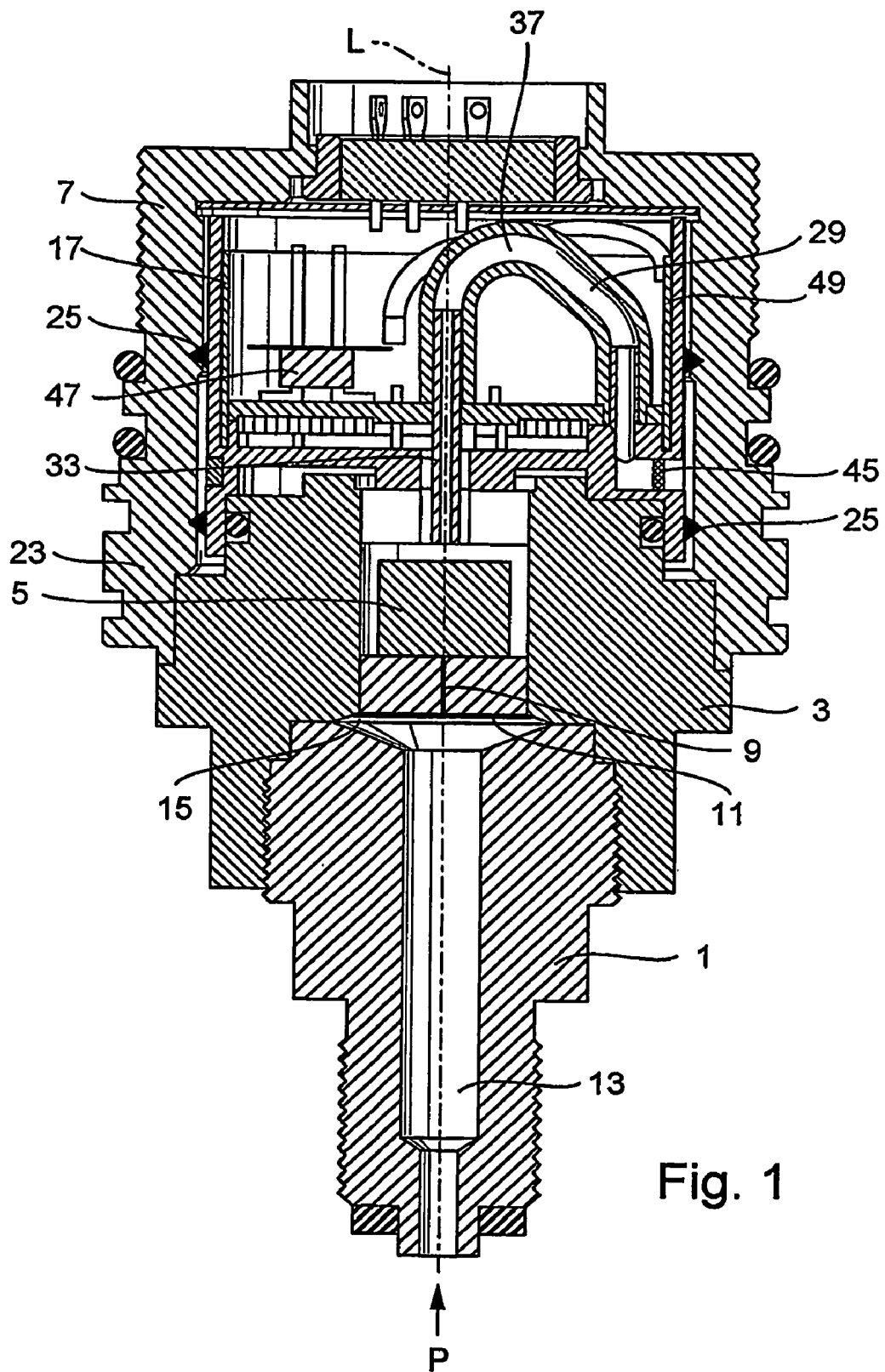
Figure 2:
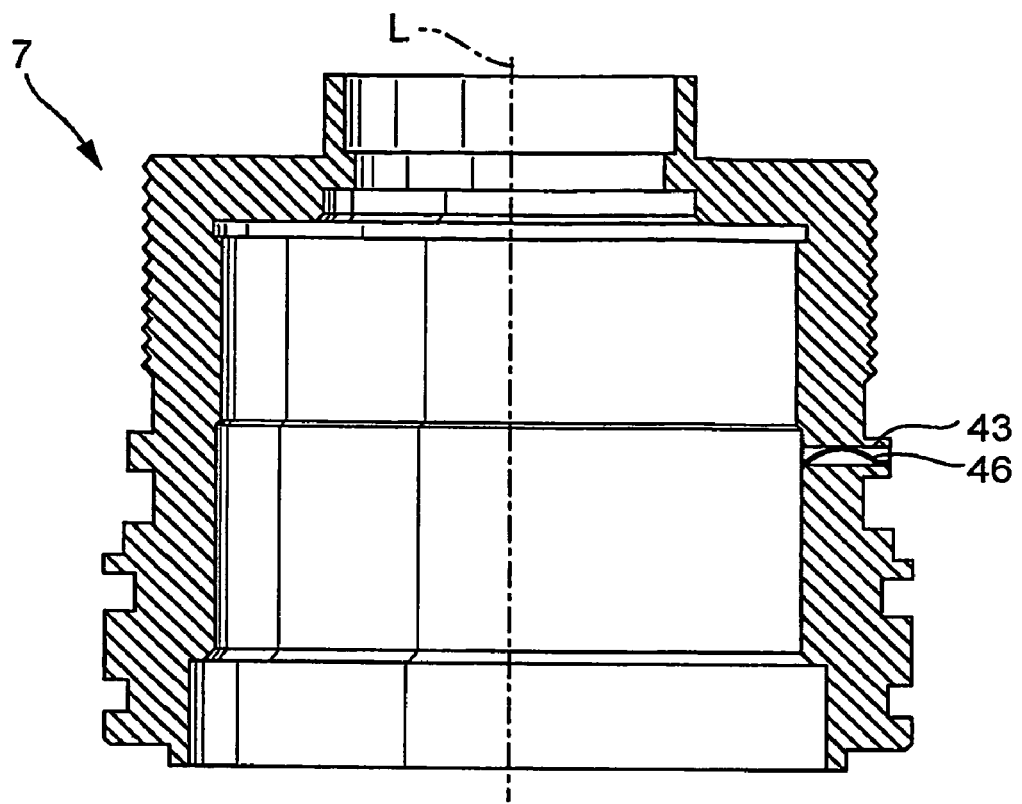
FIG. 2 shows a section through its housing.

FIG. 1 shows a section through a relative pressure measuring transmitter of the invention. The relative pressure measuring transmitter includes a process connection 1, a relative pressure sensor 5 seated in a sensor block 3, and a housing 7 partially surrounding the sensor block 3. FIG. 2 shows a section through the housing 7.

Examples of suitable relative pressure sensors are capacitive, ceramic sensors or semiconductor sensors, e.g. polysilicon sensors. In the illustrated example of an embodiment, a semiconductor sensor is represented schematically. Placed before the sensor is a pressure-forwarding seal 9, serving e.g. as a chemical seal. Seal 9 seals sensor block 3 flushly on the front of the block using a separating membrane, or diaphragm, 11, on which the pressure p to be measured acts. The pressure p to be measured is transmitted through seal 9 onto the relative pressure sensor 5.

The process connection 1 is tightly connected with the sensor block 3, e.g. screwed. It serves for securing the relative pressure measuring transmitter at a measuring site and has a central, axial bore 13 passing through it. Bore 13 opens into a chamber 15. Separating membrane 11 is situated on a side of chamber 15 opposite the bore 13. During operation, the pressure p to be measured is supplied to the relative pressure sensor 1 through bore 13.

Figure 3:
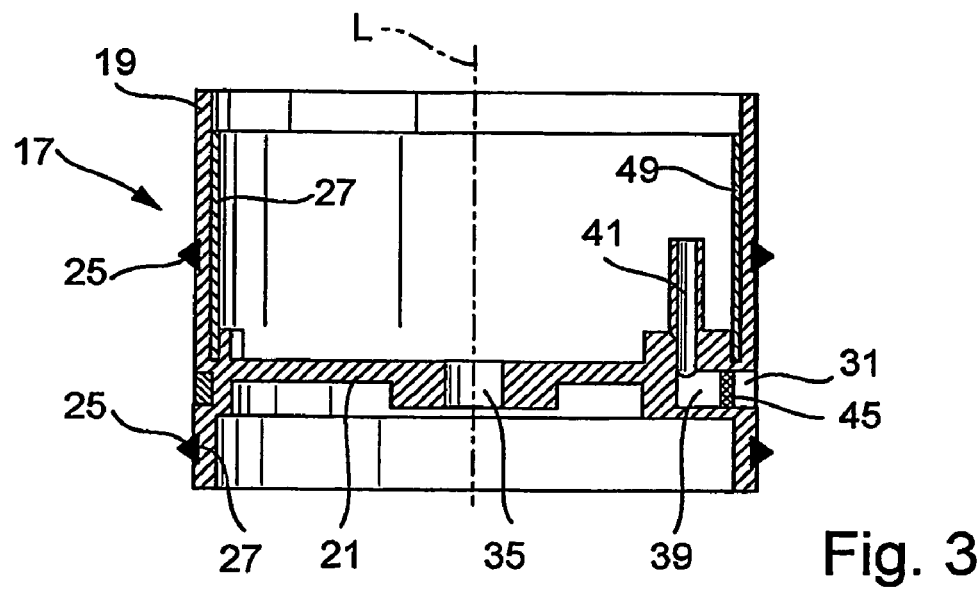
FIG. 3 shows a section through its insert.

An insert 17 is arranged in the housing 7. FIG. 3 shows a section through insert 17. Insert 17 is preferably made of a moisture-resistant material, especially a plastic. In the illustrated example of an embodiment, insert 17 is essentially pot-shaped, thus having a cylindrical section 19 closed on the bottom by floor 21.

Situated between housing 7 and insert 17 is an annularly encompassing gap 23. In the illustrated example of an embodiment, both housing 7 and insert 17 are essentially cylindrical, so also the gap 23 between them has an essentially cylindrical shape.

Gap 23 is bordered by two seals 25 compressed between housing 7 and insert 17. The seals 25 are ring-shaped. To accommodate the seals 25, insert 17 has on its outside two annularly encompassing grooves 27.

Connected to relative pressure sensor 5 is a reference pressure supply line 29, which leads into the insert 17 and vents on an outer wall 31 of the insert 17.

In the illustrated example of an embodiment, the reference pressure supply line 29 includes, tightly connected with the relative pressure sensor 5, a small pipe 33, which leads from a reference pressure side of the relative pressure sensor 5 out of the sensor module 3 and through the floor 21 of the insert 17 into the insert 17. To accommodate this, an opening 35 is provided in the floor 21.

In insert 17, a first end of a flexible tube 37 is connected pressure-tightly onto pipe 33. Tube 37 is made e.g. of silicone. Pipe 33 extends into tube 37.

Insert 17 has in the region of the venting of the reference pressure supply line 29 a blind bore 39 extending radially inwardly into the floor 21. Inside insert 17, on its floor 21, a small pipe 41 is embedded, which opens into the blind bore 39. At the thus-formed venting, floor 21 also has an opening, through which an interior of the pipe 41 stands in communication with an interior of the blind bore 39. A second end of the tube 37 is connected pressure-tightly to the pipe 41. Tube 37 is e.g. pushed onto pipe 41.

Blind bore 39 forms an opening in the outer wall 31 of insert 17, via which an interior of the reference pressure supply line 29 is in communication with the gap 23.

A bore 43 passes through housing 7, for placing gap 23 and, thus, also the reference pressure supply line 29 in communication with an environment of the relative pressure measuring transmitter.

It is possible to arrange bore 43 directly opposite the opening of blind bore 39. More advantageous, however, is when bore 43 is displaced away from the opening of the blind bore 39. In this way, the effective length of the reference pressure supply line 29 is enlarged. Preferably, a direct connection in the gap 23 between the bore 43 and the opening of the blind bore 39 extends over a circular segment about a longitudinal axis L of the insert 17 or the housing 7. In the present example of an embodiment, the two longitudinal axes L are identical.

The longest path length is achieved in the case where the bore 43 in the housing 7 is located on a side of the insert 17 lying opposite to the opening.

Preferably, bore 43 has a length of at least six millimeters. This is achievable, for example, by providing a corresponding wall thickness for the housing 7 in the region of the bore 43. If a housing 7 of slightly smaller wall thickness is used, this length can be achieved by orienting a longitudinal axis of the bore 43 such that it is displaced relative to a perpendicular to a tangent to the housing 7 in the region of the bore 43. Set into the bore 43 is s pin 46 e.g. of metal. Between bore 43 and the pin 46 is a gap, via which a pressure equilibration can transpire through the bore 43. Pin 46 is fixed in bore 43. This in accomplished, for example, by using a curved pin 46, which is driven into the bore 43.

Bore 43 and pin 46 form a flame penetration barrier. Such flame penetration barriers are required especially in the case of applications in explosion-endangered areas.

Preferably, the opening of the blind bore 39 is closed by a moisture-rejecting, gas-permeable filter 45. Suited for this are e.g. filters of metal, polytetrafluoroethylene (PTFE) or Goretex fabric.

Situated in the interior of insert 17 is an electronic circuit 47, e.g. an embedded electronics for the relative pressure sensor 5. To protect the electronic circuit 47 against electromagnetic interference, the interior of insert 17 is provided with an electrically conductive layer 49, which encloses an inner space of the insert 17. Layer 49 can be e.g. a metal, e.g. copper, film applied on the inner wall of the insert, or a metallized lacquer.

The invention claimed is:

1. A relative pressure measuring transmitter, comprising:

a housing;

an insert arranged in said housing;

a gap between said housing and said insert;

a relative pressure sensor;

an electronic circuit being situated in the interior of said insert; and a reference pressure supply line connected to said relative pressure sensor, said reference pressure supply line leads into said insert, vents on an outer wall of said insert, and has an interior, which is connected with said gap via an opening in said insert, wherein;

a bore passes through said housing, for placing said gap in communication with an environment of said relative pressure measuring transmitter, said insert comprises a moisture-resistant material, especially a plastic; and in the interior of said insert, an electrically conductive layer is provided, which encloses an inner space of said insert, to protect said electronic circuit against electromagnetic interference.

2. The relative pressure measuring transmitter as claimed in 1, wherein:

said gap is bounded by two seals compressed between said housing and said insert.

3. The relative pressure measuring transmitter as claimed in 1, wherein:

a direct connection in said gap between said bore and said opening extends over a circular segment about a longitudinal axis of said insert or said housing.

4. The relative pressure measuring transmitter as claimed in 1, wherein:

said bore in said housing is located on a side of said insert lying opposite to said opening.

5. The relative pressure measuring transmitter as claimed in 1, wherein:

said bore has a length of at least six millimeters, and a pin is inserted into said bore.

6. The relative pressure measuring transmitter as claimed in 1, wherein:

said opening is closed by a moisture-rejecting, gas-permeable filter.

* * * * *